United States Patent [19]

Neukirchner et al.

[11] Patent Number: 5,040,122

[45] Date of Patent: Aug. 13, 1991

[54] METHOD AND SYSTEM TO DETERMINE THE POSITION OF A LAND VEHICLE DURING MOVEMENT OVER A PREDETERMINED PATH

[75] Inventors: Ernst-Peter Neukirchner, Hildesheim; Dietmar Schlögl, Sibbesse, both of Fed. Rep. of Germany

[73] Assignee: Robert Bosch GmbH, Stuttgart, Fed. Rep. of Germany

[21] Appl. No.: 190,239

[22] Filed: May 2, 1988

[30] Foreign Application Priority Data

May 6, 1987 [DE] Fed. Rep. of Germany ....... 3715007

[51] Int. Cl.⁵ .............................................. G06F 15/50
[52] U.S. Cl. .................................. 364/449; 364/454; 318/587; 342/451
[58] Field of Search .............. 364/449, 451, 454, 457; 318/583, 587; 340/988, 990; 342/450-451; 73/178 R

[56] References Cited

U.S. PATENT DOCUMENTS

| | | | |
|---|---|---|---|
| 4,435,760 | 3/1984 | Kuno et al. | 364/449 |
| 4,563,685 | 1/1986 | Matsumoto et al. | 364/444 |
| 4,633,407 | 12/1986 | Freienstein et al. | 364/450 |
| 4,638,438 | 1/1987 | Endo et al. | 364/449 |
| 4,663,719 | 5/1987 | Matsumoto et al. | 364/444 |
| 4,672,563 | 6/1987 | Harumatsu et al. | 364/449 |
| 4,728,888 | 3/1988 | Bauer et al. | 33/361 |
| 4,733,181 | 3/1988 | Bauer | 33/361 |
| 4,734,863 | 3/1988 | Honey et al. | 364/449 |

FOREIGN PATENT DOCUMENTS 2927325 1/1981 Fed. Rep. of Germany .
2180066 3/1987 United Kingdom ................ 340/988

OTHER PUBLICATIONS

Digital Filters, Second Edition, pp. 59-63, 241-244, Author: R. W. Hamming, 1977.
Derwent WPI abstract of European Patent Pub. 0 196 498, Freienstein, Duchs, Neukirchner, Pilsak & Schlögl.
Derwent WPI abstract of DE-OS 2927325 (patented Apr. 14, 1988), Szczesny, assigned Teldix GmbH (subsidiary of Robert Bosch GmbH).

Primary Examiner—Gary Chin
Attorney, Agent, or Firm—Frishauf, Holtz, Goodman & Woodward

[57] ABSTRACT

To supplement an electronic navigation system, for example associated with a locating map storing possible paths of a vehicle, two path sensors are provided, one (10) evaluating vehicle operating data and distance traveled, and the other (12) evaluating position of the vehicle with respect to the geomagnetic field. In accordance with the invention, and in order to eliminate drift errors of the vehicle operating sensor (10) and disturbances of the magnetic field sensed by the magnetic field sensor, the output signals from the vehicle operating sensor are differentiated to eliminate long-term drift, and the output signals from the field sensor are integrated to eliminate short disturbances, both the differentiation as well as the integration steps being carried out with respect to distance traveled and not with respect to time. The respectively differentiated and integrated signals are then combined in an adder (28) for application to a course or navigation computer of standard construction.

11 Claims, 4 Drawing Sheets

ROUTE ORIGINAL

ROUTE SENSED ONLY BY WHEEL SENSORS

ROUTE SENSED ONLY BY MAGNETIC FIELD SENSOR

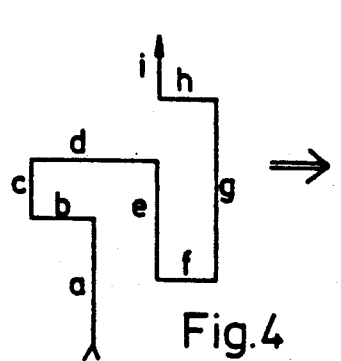
Fig.4
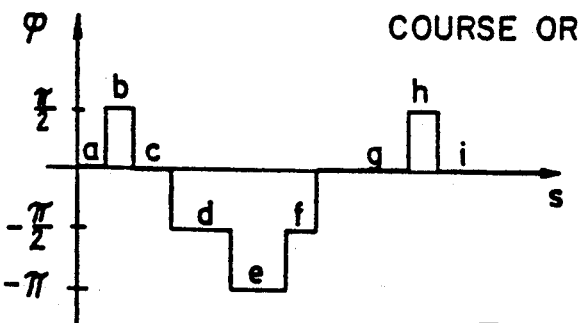
COURSE ORIGINAL
Fig.5
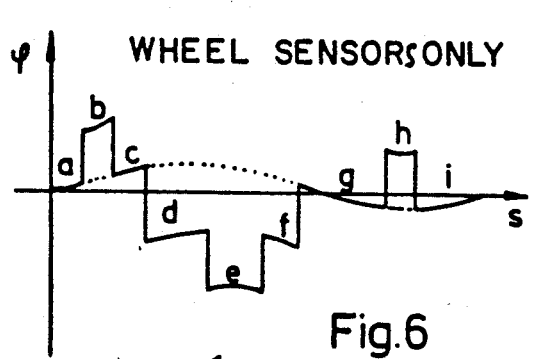
WHEEL SENSORS ONLY
Fig.6
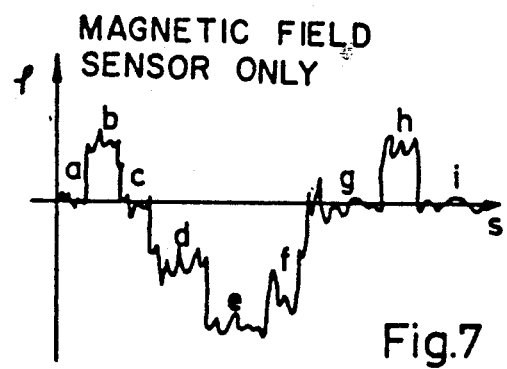
MAGNETIC FIELD SENSOR ONLY
Fig.7
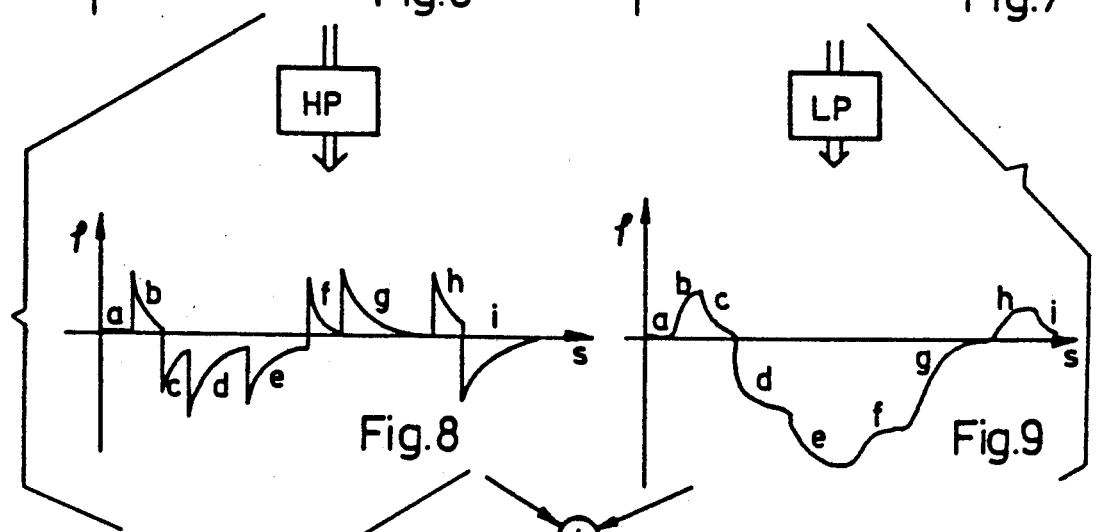
Fig.8
Fig.9
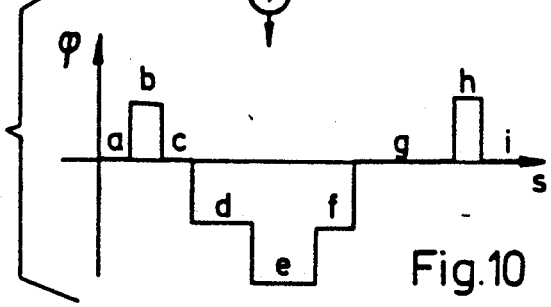
Fig.10

METHOD AND SYSTEM TO DETERMINE THE POSITION OF A LAND VEHICLE DURING MOVEMENT OVER A PREDETERMINED PATH

REFERENCE TO RELATED PUBLICATION

German Patent Disclosure Document DE-OS 29 27 325.

The present invention relates to a locating system for vehicles, and more particularly to a method and system to determine the position of a vehicle with respect to a map as the vehicle travels over a given path, so that the operator of the vehicle can be given position indications to assist the operator in orienting himself with respect to the map, and steering the vehicle.

BACKGROUND

Navigation and locating systems for automotive vehicles have been proposed in which data necessary to determine the location of the vehicle are obtained by planimetric calculations. The actual position is obtained by considering vehicle data from a predetermined initial starting or reference position. It has been found that, as the path of the vehicle increases in length, errors in determining the path may accumulate. It has been proposed to compare the calculated data of the position of the vehicle, that is, calculated based on vehicle operating data with respect to the initial or reference position, and to correct the data from time to time by comparison with data stored in the system based on maps of the area in which the vehicle is operating.

If the vehicle is operating in an urban environment, correction can be effected by comparing the calculated position of the vehicle with respect to the actual position it should have, as determined by a map, and then correcting the position data. When operating the vehicle outside of urban areas, where comparison of data with urban maps is not possible, for example upon cross-country trips, it is no longer feasible to determine the precise position of the vehicle in accordance with a planimetric calculation. Vehicle operating data are derived from wheel sensors and the basis for the impossibility of correcting errors appears to be due to the dynamics of the wheels and the tires with which the wheels are equipped. For example, the diameter of the tires changes upon change in air pressure therein; additionally, the tire diameter may change due to loading of the vehicle, differential loading at different sides of the vehicle, or inclination of the tires upon passing through a curve. For short distances, obtaining vehicle operating data from tires is sufficiently accurate; when long distances are to be covered, however, errors can become cumulative and lead to complete loss of usable data from the vehicle wheels for use in calculating a navigational path or with reference to an actual navigational path to be traversed.

The geomagnetic field provides long distance stability, so that it has been proposed to use the geomagnetic field data rather than vehicle operating data to determine a navigational path. Yet, it has been found that the geomagnetic field is subject to distortion, for example due to large masses of iron, such as other vehicles, especially trucks, bridge structures, railway and urban rail tracks and electrical systems, and electrical currents arising in the form of ground currents or induced from high-tension transmission lines. Distorted earth fields can cause substantial errors, particularly in the determination of a course to be taken over a short distance.

It has previously been proposed-see German Patent Disclosure Document DE-OS 29 27 325, SZCZESNY/TELDIX GmbH,—to evaluate both vehicle operating data and geomagnetic field data and apply both of these data to a navigation or course computer. The course computer or navigation computer receives the sum of prior course data, the difference of the course data, and a correction signal. The correction signal is obtained from geomagnetic field data which have been suitably processed, based on the difference between the actual geomagnetic field and preceding course data. This value is then multiplied with two correction factors. One of the correction factors determines the tracking speed, considering the cycling time of the course computer. The other correction factor is dependent on the moving speed of the vehicle, thus is dependent both on path or course distance as well as on the time taken to cover the distance. If the geomagnetic field is disturbed, the course or navigational direction is determined, essentially, by the vehicle operating data.

THE INVENTION

It is an object to provide a method and a system which simplifies the processing of vehicle operating data and geomagnetic field data, thereby decreasing the computation time in the course computer while increasing the accuracy of the position output derived from the course computer.

Briefly, a first output signal is obtained from vehicle mounted differential odometer sensors determining the direction and distance of movement of the vehicle. A second output is obtained evaluating the magnetic field with reference to the vehicle in any position of the vehicle and during movement over its path. In accordance with a feature of the invention, the first output signals from the vehicle operating sensors are differentiated; the second output signals from the geomagnetic field sensors are integrated, and the integrated and differentiated signals are then combined and applied to a course computer which may be of any suitable and standard construction.

The system has the advantage that the vehicle operating data and the geomagnetic field data can be applied to the course computer after only simple and short term computing operations. Differentiating and integrating are the computing operations used, and differentiation and integration are carried out, in accordance with a feature of the invention, with respect to path distance, that is, distance of movement of the vehicle, rather than with respect to time.

The type of operation associated with the respective signals is based on the consideration of the characteristics of the sensors used, both with respect to long distances as well as with respect to short distances. The particular operations, thus, can remove the most likely causes of errors from the sensor output signals, by suppressing or eliminating such errors, while permitting that portion of the signals free from errors to be applied to the course or navigation computer.

In accordance with a preferred feature of the invention, differentiation and integration are carried out exclusively with respect to a certain distance covered by the vehicle, and not with respect to time. Time is a factor which is not primarily relevant from deviation from a given path.

In accordance with a preferred feature of the invention, differentiation can be carried out by passing the vehicle operating signals through a high-pass filter, so that the differentiator, simply, can be such a filter; a low-pass filter can be used as the integrator. Thus, the boundaries of influences on data based on both short distances as well as long distances can be readily determined by considering the boundary frequencies and setting these frequencies precisely. It is also possible to predict remaining errors, and the tolerances of accuracy of determination, so that error tolerances can be predicted.

The system to carry out the method can be simple, and constructed, as known, to provide the vehicle operating data and the geomagnetic field data. The apparatus processing the data is simple, so that both the size and the storage capacity of the navigation computer can be reduced, with a shortened calculation time while increasing the accuracy of determination of the position of the vehicle, and hence of the further path thereof with respect to a predetermined course.

The system uses a vehicle operating sensor which is stable with respect to short distances but subject to drift over long distances, and a sensor which is stable with respect to long distances, but subject to short distance disturbances. The combination of the two sensors provides the characteristic which enables accuracy for short distance stability with accuracy in position based on long-distance stability. To prevent errors from interfering with the respective sensor signals, the sensor evaluating the vehicle data, which are stable over a short period of time, is coupled to a differentiator. The long distance stable sensor is the geomagnetic field sensor which, however, is subject to disturbances of the field due to presence of iron, for example bridge works, over-passes, other vehicles and the likes. It has an integrating element connected thereto.

Both the differentiator and the integrator can be actual differentiator and integrator circuits, or the signals can be processed for differentiation and integration by well known software in a computer program.

The system permits linear processing of the data derived from the sensor, thus requiring only little memory capacity within the navigation computer, so that the overall system can be substantially simplified. The computation speed is high and cycling time is low, which permits optimal matching of the differentiator and the integrator to the vehicle operating sensor and the geomagnetic field sensor, respectively, while providing high accuracy of calculated course data.

The differentiators and integrators are coupled to a path length sensor, since differentiation and integration are carried out regularly with respect to a certain distance covered by the vehicle rather than with respect to time. The distance parameter, rather than time, is primarily determinative of the path of the vehicle, and changes in the path of the vehicle, and thus provides a direct way to obtain the course and position data. Since it is necessary to only consider one parameter for differentiation or integration, respectively, the circuit or programming requirements, respectively, can be held to a minimum without any excess for cross-correlation of additional parameters.

In accordance with a feature of the invention, the differentiator is a high pass and the integrator a low pass, thus setting precisely and clearly defined boundaries for the influence of errors both with respect to short-distance stable data as well as disturbances on long-distance stable data. Undesired influence, as a consequence of change of a boundary frequency of the one or the other limiting frequency at the respective sensor, thus can be eliminated; the boundaries for both sensors can be the same.

Drawings, illustrating embodiments of the invention:

FIG. 4 is a schematic diagram of a complex path;

FIG. 5 illustrates the angle $\phi$ (ordinate) with respect to the path s (abscissa) of the vehicle, as it passes over the course of FIG. 4;

FIG. 6 shows the data derived from wheel sensors of the vehicle passing over the path of FIG. 4;

FIG. 7 shows the data derived from the geomagnetic field sensor as the vehicle passes over the course of FIG. 4;

FIG. 8 shows the signals of FIG. 6 after passing through a high-pass filter;

FIG. 9 shows the data of FIG. 7 after passing through a low-pass filter; and

FIG. 10 shows the data after addition of the signals of FIGS. 8 and 9.

DETAILED DESCRIPTION

Figure 1:
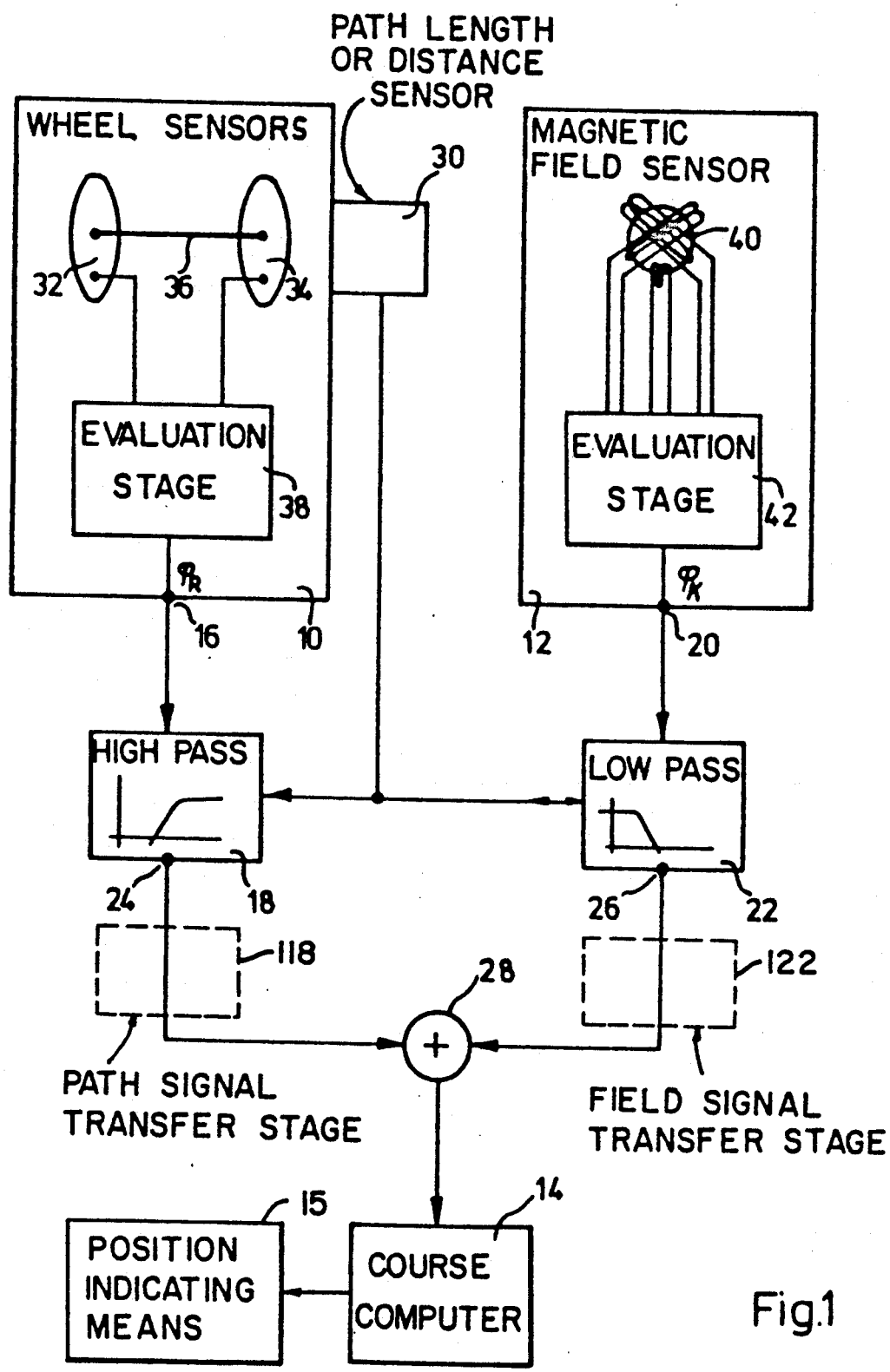
FIG. 1 is a highly schematic block circuit diagram of the system and illustrating a vehicle operating sensor, a magnetic field sensor, and a navigation or course computer.

Referring first to FIG. 1:

A sensor 10 evaluates vehicle operating data; an geomagnetic field sensor 12 senses and provides signals representative of the vehicle as it changes direction, with respect to the geomagnetic field.

In accordance with the invention, a high-pass filter 18 is connected to receive the signals from sensor 10 and the low-pass filter 22 receives the signals from sensor system 12. These signals are combined by a combining element 28 which, in turn, is connected to apply the combined signals to a course computer 14. The computer's output is fed to a position indicating means 15, of which numerous kinds are long-known in the art. The combining circuit, as shown, is an adder. The term "adder" is to be considered in its algebraic sense and, of course, may also be a subtracting element.

The sensors 10 and 12 are commercial articles, available as sensor modules or units from the industry. It is thus only necessary to describe, in general, what the sensors 10 and 12 contain and what signals they provide.

Sensor 10 senses data derived from vehicle sensors 32, 34. These vehicle sensors sense pulses upon rotation of the wheels, preferably from wheels located on the same axle 36. The sensors 32, 34 provide their sensor output pulses to an evaluation stage 38 which calculates the course angle $\phi_R$. The characteristic function for determining the course evaluation can be obtained from the equation $$d\phi(s)/ds = dr(s)/ds - f(s) \quad (1)$$

wherein
$\phi$ is the absolute course angle; s is the coursing path or distance over a predetermined path portion; r is the course angle measured by the wheel sensors; and f is the drift with respect to a true course. The course drift f is not a constant value, but depends on various external influences. The course drift can be limited if the maximum course length T, from a reference, is low, in other words, if the maximum course length T is selected to be a low limiting value, for example:

$$\int_{s}^{s+T} f(t)\, dt \leq = 5° \quad (2)$$

If the value of the integrated function is less than 5°, the influence on course drift can still be neglected. This is an empirical value, based on experience.

The sensor, generating the magnetic field data, is a dual axis magnetic sensor 40, having orthogonal sensing axes, providing directional orientation signals which are coupled to an evaluation stage 42. The evaluation stage 42 which are calculates, based on the components of the geomagnetic field with respect to the vehicle, a course angle $\phi_k$. The characteristics of determining the angle by means of a magnetic field sensor can be characterized by the equation $$\phi(s) = k(s) - g(s) \quad (3)$$

wherein k is the course angle derived from the magnetic field sensor and g is the disturbance or error angle caused by external influences. Let U be the maximum extent of the magnetic disturbances to be expected, then, when U is selected to be sufficiently high, the error angle can be defined as $$1/U \int_{s}^{s+U} g(t)\, dt \leq = 5° \quad (4)$$

An additional element is used, namely a path distance sensor 30 which, suitably, is coupled to the wheel axle 36 to which wheel sensors 32, 34 are applied. Distance sensor 30 is coupled both to the high-pass as well as to the low-pass filter 22 and provides the path or distance signals s from which a limit or boundary value T can be derived.

DETERMINATION OF NAVIGATION COURSE, WITH REFERENCE TO FIGS. 2a-2c AND 3a-3c

Figure 2A:
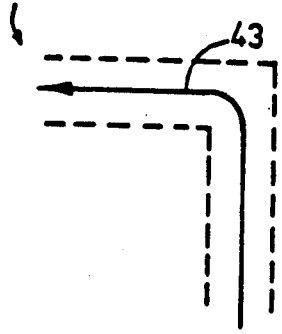
FIG. 2a illustrates an original ideal path of a vehicle.
Figure 3A:
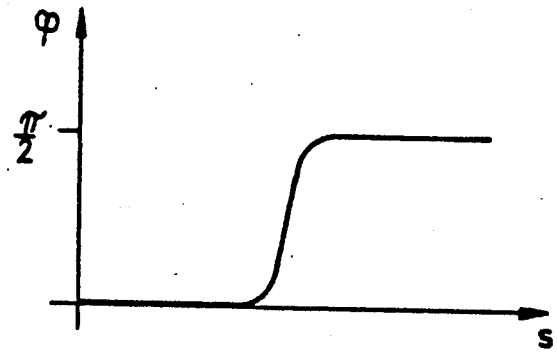
FIG. 3a is a graph illustrating the original path as an angle $\phi$ with respect to a path distance (abscissa) s.

The sensor 10 evaluates only vehicle operating data; the sensor 12 only data of the vehicle with respect to the geomagnetic field. FIG. 2a illustrates a portion of a road which has a curve at a right angle. The original route is shown in FIG. 2a, and line 43 represents the path of the vehicle over the road shown in broken lines in FIG. 2a. A course angle $\phi$, corresponding to the path 43 of the vehicle, is shown in FIG. 3a, in which the abscissa represents the distance of travel of the vehicle, s.

Figure 2B:
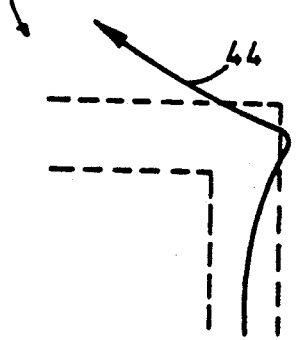
FIG. 2b illustrates the path as sensed by a vehicle operating sensor.
Figure 3B:
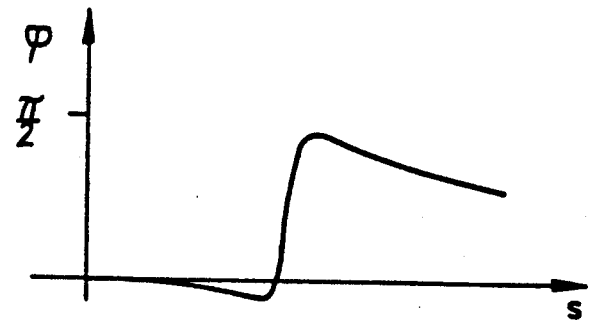
FIG. 3b is a graph similar to FIG. 3a based on the data from the wheel sensors of FIG. 2b.

Sensor 10 provides output signals shown by curve 44 in FIG. 2b when the vehicle moves along the path 43 of FIG. 2a. The curve 44 is, schematically and generally, representative of the sensor output, under the assumption that the drift of course deviation is constant and unvariable. Curve 44 is shown highly exaggerated; in an actual case, the curve 44 would more closely approach curve 43; curve 44 has been drawn in the manner shown for better visualization and illustration. The course angle, with respect to distance traveled, is then shown in FIG. 3b.

Figure 2C:
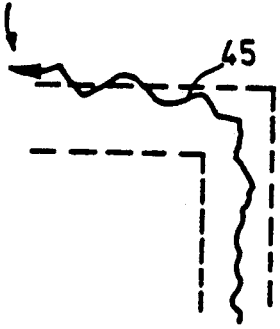
FIG. 2c illustrates the path as sensed by an earth magnetic field sensor.
Figure 3C:
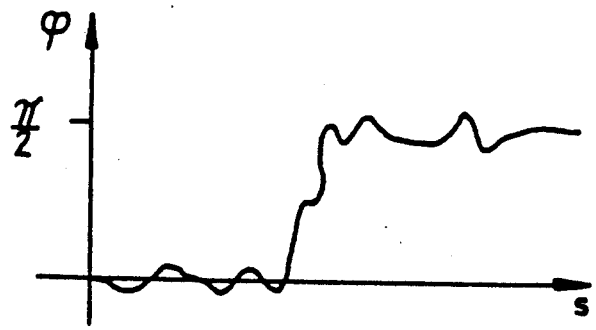
FIG. 3c is a graph similar to FIG. 3a based on the geomagnetic field sensor data shown in FIG. 2c.

FIG. 2c illustrates the output from the field sensor 12 when the vehicle moves in the path 43. Again, it is assumed that the changing magnetic disturbances are superposed on, and modify the actual course angle. The disturbances, again, are shown exaggerated and for purposes of illustration. FIG. 3c shows the course angle, subject to the disturbances, with respect to path travel of the vehicle.

A comparison between the illustrations of the FIGS. 2b and 2c, or FIGS. 3b and FIG. 3c, respectively, graphically illustrates the characteristics of the sensors:

The sensor 10, evaluating the course angle $\phi_R$ of the vehicle data, over small distances, follows the actual course angle $\phi$ quite accurately; as the distance traveled, s, increases, the deviation becomes cumulative and increases more and more.

The course angle $\phi_K$ of the glomagnetic field, evaluated by sensor 12, is accurate with respect to an average value over a substantial length of distance traveled; with respect to short distances, however, disturbances are obvious.

A boundary or limit value is set for the maximum path length on which the influence of drift of the course derived from sensor 10 can be neglected; this limit path length is a length T. The maximum lineal extent of magnetic disturbances to be expected can be defined as U. If the limit values for T and for U are set to accomodate a deviation of the course angle from the desired course angle (see FIGS. 2a, 3a) under 5°, then the useful regions of the data sensed by the sensor 10 and of the geomagnetic field data sensed by the sensor 12 will overlap. In accordance with a feature of the invention, this discovery permits combining the outputs of the two sensors to obtain elimination of potential error regions; no region of the path traveled will result in a higher probability of course or navigational error.

Elimination of potential error regions due to data sensed by the sensor 10 and available at terminal 16 is obtained, in accordance with a feature of the invention, by connecting the terminal 10 to a high-pass filter 18; likewise, terminal 20 from sensor 12 is connected to a low-pass filter 22. The high-pass filter 18 and the low-pass filter 22 are designed to have a frequency characteristic, in which the "frequency" is defined as event per elementary path length, that is, event with respect to distance traveled. This is to be distinguished from ordinary differential analysis as events with respect to time.

A path length or distance travel sensor 30 is provided, coupled both to the high-pass filter 18 and to the low-pass filter 22. Such a sensor, of course, can be similar to the usual odometer on a vehicle. The cut-off frequency 1/S of the high-pass filter 18 and of the low-pass filter 22 are equal. Upon combination of the output signals, thus, a linear frequency band will be obtained. The determination of the cut-off frequency 1/S is done by considering the above-referred-to limiting path lengths T and U, based on the relationship:

$$U < S < T \quad (5)$$

Preferably, a potential error region derived from either one of the sensors 10, 12 is compensated. The reciprocal, S, of the cut-off frequency 1/S, thus, is placed roughly between the values T and U. A suitable limit value is at about 200 meters, resulting in a cut-off frequency of 1:200. This has been found, in actual practice, particularly suitable (this corresponds, roughly, to ⅛ mile).

The output signals of the sensor 10 evaluting vehicle operating data and of the sensor 12, evaluating the position of the vehicle with respect to the geomagnetic field, are connected from terminal 24 of the high-pass filter and terminal 26 of the low-pass filter, respectively, to an adder 28 and, after addition, to the course or navigation computer 14. The combination of the signals in the adder 28 results in an overall signal which has a smaller error with respect to course angle over the entire distance of the traveled path than the maximum error sensed by either the sensor 10 after the path length T, or the maximum error of the geomagnetic field sensor 12 within the path length or distance U. Preferably, the output signals of the sensors 10 and 12 are weighted equally. It may occur that, due to local conditions, the influence of the one or the other sensor 10, 12 should be increased or decreased. If this is required, linear or non-linear signal path transfer stages 118, 122 can be serially connected between the high-pass filter 18 and/or the low-pass filter 22 and the adder 28. Since these signal transfer stages are not stricly necessary, they have been shown in broken lines in FIG. 1.

DETAILED OPERATION, WITH REFERENCE TO FIGS. 4–10

FIG. 4 illustrates, by way of example, a path or route to be taken by a vehicle, in which the path is formed by a plurality of path segments which each extend at right angles to each other. The separate path segments have been identified by a, b... i for ease of drawing comparison, and similar identifying letters are shown in FIG. 5, which shows the course angle $\phi$ over the path distance s. These angles as shown in FIG. 5 would be obtained in an ideal case, that is, if both sensors 10 and 12 would operate ideally, without drift, disturbances or the like.

The course angle $\phi_R$ at the output 16 of the sensor 10 is shown in FIG. 6. The course angle $\phi_R$ drifts towards the null or center line which is shown by the phantom dotted line 110. The representation is drawn with respect to an arbitrarily assumed sinusoidal course of the drift angle. It is more frequent in actual practice that a drift angle, diverging from the center or null line may occur which, after some distance has been passed by the vehicle, permits no determination or consideration with respect to the actual navigational path to be pursued.

FIG. 7 illustrates the course angle $\phi_K$ at the output of the sensor evaluating the geomagnetic field data. The measured course angle $\phi_K$ has disturbances modulated or superimposed thereon which may occur over short path distances. The average value, however, generally follows the course angle as shown in FIG. 5.

FIGS. 8 and 9 are located beneath FIGS. 6 and 7, respectively, in alignment, in order to better illustrate, by analogy, the operation of the system of the diagram of FIG. 1 when considering the signals at the outputs 24 of the high pass 18 (FIG. 8) and the output 26 of the low pass 22 (FIG. 9), respectively.

FIG. 8 shows the course angle of any change in the route, taken with respect to a short route length or distance traveled. Changes during a longer distance traveled, which may also occur due to drift, are thereby eliminated. The signal changes from a peak towards the null or center line in accordance with an exponential function.

FIG. 9 illustrates the course changes within a path traveled which hardly leads to a change in the signal. The signal will match the actual course angle only after some substantial path has been covered. Thus, short disturbances are suppressed.

FIG. 10 illustrates the signal after addition of the output signal from terminal 24 of the high-pass filter 18 and the output signal from terminal 26 of the low-pass filter 22.

Let it be assumed that the cut-off frequencies of the high pass 18 and of the low pass 22 are equal, then addition, as can be readily seen from the graphic representation, will result in a signal which follows the course angle $\phi$. Since the course drift of the sensor 10 evaluating the vehicle data, and the disturbances of the geomagnetic field sensor 12 are compensated or eliminated, the composite signal will again represent the ideal course of the angle $\phi$, illustrated in FIG. 5, over the entire distance s which is traveled.

It is not necessary, in actual practice, to carry out differentiation of the signal derived from the sensor 10 by a high-pass filter 18, which is illustrated in FIG. 1 as a specific circuit element. The sensor 10 can be easily constructed to provide, already, differentiated values since the measurement of the path can be carried out with respect to small incremental path distances, that is, with respect to small differences in the sense of differentials. Thus, the output signals from the sensor 10 may, already, be differentiated signals. The differentiator 18 shown in FIG. 1, that is, the high-pass filter, is also illustrated in FIG. 8 and is shown only for better visualization of the invention. Especially, if the signals are to be processed when converted into digital form, differentiation, integration and/or addition can be carried out by software, as well. The illustration of FIG. 1, then, is to be deemed merely for visualization of the general concept.

Wheel sensors and evaluation circuitry as shown by stage 38 are well known in the industry, and electronic components as well as evaluation circuits therefor are available commercially, and used, for example, in antibrake lock systems (ABS) in automotive vehicles. Similar systems may be used in connection with the present invention.

Figure 1A:
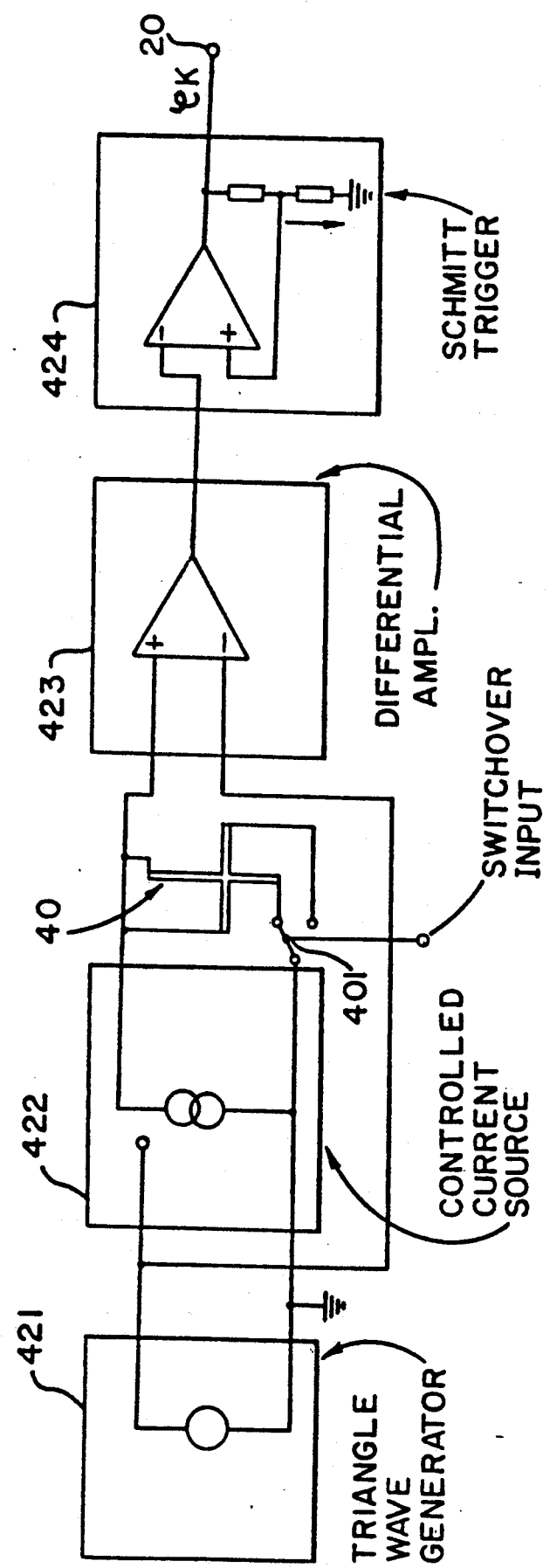
FIG. 1a is a schematic diagram of the magnetic sensor.

The field sensor 40 and evaluation electronics 42, part of the sensor system 12, are shown in detail in FIG. 1a. A triangle wave generator 421 provides triangular output waves which control generation of currents from a controlled current source 422. The output from the controlled current source is applied alternately to the orthogonally arranged field sensor coils 40. Switchover is controlled by controlling a switch 401 for alternately connecting the orthogonally arranged coils to the controlled current source 422. The output from the coils is connected to a differential amplifier which also receives as a comparison signal the voltage from the triangle wave generator so that, as the geomagnetic field distorts the current flowing through the respective measuring coils, a measuring output can be obtained from the differential amplifier 423. The output of the differential amplifier is connected to a Schmitt trigger 424, the output of which forms the terminal 20 at which the signal $\phi_K$ is available.

A course or navigation computer 14 is described in EP-A 0/96 498, by the present inventors and three co-inventors, published Oct. 8, 1986 in German.

We claim:

1. In a vehicular navigation system,
   a method of determining, from a known initial vehicle position, the current position of a land vehicle during movement over a predetermined path, and of navigating the vehicle, said system having
   a first sensor (10) measuring direction and distance of movement, in any specific direction, of the vehicle, and providing a sequence of first vehicle operating output signals representing said direction and distance of movement;
   a second sensor (12) measuring directional orientation of the vehicle, and change thereof, with respect to a surrounding geomagnetic field, during movement of the vehicle over its predetermined path, and providing a sequence of second, magnetic field signals representing said directional orientation; and
   a course or navigation computer (14),
   said method comprising the steps of
   storing in said computer said known initial vehicle position,
   differentiating, with respect to distance travelled by said vehicle, said first output signals from the first sensor;
   integrating, with respect to distance travelled by said vehicle, said second magnetic field output signals;
   combining said differentiated first signals and said integrated second signals;
   applying said combined signals to said course computer (14);
   processing said combined signals in said course computer along with said stored initial vehicle position to obtain an updated vehicle position value,
   providing, from said computer, an indication of said updated vehicle position value to an operator, and
   steering said vehicle in accordance with said indication.

2. The method of claim 1, wherein said combining step is carried out by linear processing, that is, algebraic addition (28), of said differentiated first signals and said integrated second signals.

3. The method of claim 1, wherein
   said differentiation step comprises passing said first output signals through a high-pass filter; and
   said integration step comprises passing said second output signals through a low-pass filter.

4. The method of claim 3, wherein said differentiation step in the high-pass filter and said integration step in the low-pass filter are carried out, respectively, with respect to similar lower and upper cut-off frequencies.

5. The method of claim 4, wherein each said cut-off frequency is so determined that the reciprocal value (S) of each frequency is less than the maximum path distance (T) in which the influence of drift on the ideal course of the vehicle by the first sensor is below a predetermined course angle, and in which the influence of disturbances on the second signals is greater than the course distance (U) in which expected magnetic disturbances are below said predetermined course angle.

6. The method of claim 5, wherein said predetermined course angle determining each cut-off frequency is about 5°.

7. The method of claim 2, wherein
   said said differentiation step and said integration step are each carried out with respect to a cut-off frequency of 1/S, where S equals about 200 meters.

8. The method of claim 1, wherein
   said combining step comprises algebraically adding the differentiated first signals and the integrated second signals.

9. The method of claim 1, wherein
   said differentiated first signals and said integrated second signals are equally weighted.

10. The method of claim 1, including the step of determining the predetermined path lengths by evaluating an absolute value of distance traveled by two wheels on one axle (36) of the vehicle, and the difference of path lengths traveled by said two wheels.

11. In a vehicular navigation system,
    a method of indicating to a vehicle operator, from a known initial position, the current position of a land vehicle during movement over a predetermined path, and of navigating the vehicle, said system having
    a first, differential odometer, sensor (10) measuring direction and distance of movement, in any specific direction, of the vehicle, and providing first vehicle operating output signals having comparatively high short-term accuracy;
    a second, geomagnetic field, sensor (12) measuring directional orientation of the vehicle, and change thereof, with respect to a surrounding geomagnetic field, during movement of the vehicle over its predetermined path, and providing second, magnetic field, signals having comparatively high long-term accuracy; and
    a vehicle navigation computer (14),
    said method comprising the steps of
    storing said known initial vehicle position in said computer,
    differentiating, with respect to distance, said first output signals from the first sensor;
    integrating, with respect to distance, said second magnetic field output signals;
    combining said differentiated first signals and said integrated second signals to provide a third output signal of comparatively high accuracy both short-term and long-term;
    applying said third output signal, at regular intervals during travel by said vehicle, to said navigation computer (14), for updating of said stored initial vehicle position, thereby permitting regular midcourse correction of vehicle position data stored in said computer and keeping errors in said stored vehicle position data within predetermined acceptable tolerances;
    indicating the updated vehicle position to said vehicle operator; and steering the vehicle in accordance with said updated vehicle position indication.

* * * * *